United States Patent

Sano et al.

[11] Patent Number: 5,969,940
[45] Date of Patent: Oct. 19, 1999

[54] MECHANICAL STRUCTURE OF INFORMATION PROCESSING DEVICE

[75] Inventors: Tadashi Sano, Yokohama; Mitsuo Horiuchi, Sagamihara; Shigeru Ishii, Hadano, all of Japan

[73] Assignee: International Business Machines Corporation, Armonk, N.Y.

[21] Appl. No.: 08/945,933

[22] PCT Filed: Jun. 8, 1995

[86] PCT No.: PCT/JP95/01161

§ 371 Date: Mar. 19, 1998

§ 102(e) Date: Mar. 19, 1998

[87] PCT Pub. No.: WO96/42044

PCT Pub. Date: Dec. 27, 1996

[51] Int. Cl.$^6$ .................................................... H05H 7/20
[52] U.S. Cl. ..................... 361/687; 361/690; 361/700; 361/707
[58] Field of Search ..................... 361/687, 690, 361/704, 707–711, 715–722, 724

[56] References Cited

U.S. PATENT DOCUMENTS

| | | | |
|---|---|---|---|
| 5,134,547 | 7/1992 | Takamizawa | 361/690 |
| 5,262,922 | 11/1993 | Yamaji et al. | 361/690 |
| 5,424,913 | 6/1995 | Swindler | 361/690 |
| 5,731,952 | 3/1998 | Ohsami et al. | 361/687 |
| 5,805,417 | 9/1998 | Nakagawa et al. | 361/687 |

FOREIGN PATENT DOCUMENTS

| | | |
|---|---|---|
| 51-150237 | 12/1976 | Japan . |
| 2-224361 | 9/1990 | Japan . |
| 6-2432 | 1/1994 | Japan . |

Primary Examiner—Gregory Thompson
Attorney, Agent, or Firm—Anthony N. Magistrale; Jack V. Musgrove; Andrew J. Dillon

[57] ABSTRACT

Provided is a mechanical structure, for an information handling unit in which are included one or more exchangeable electric components, whose interior is enclosed by a box. The box has: an exchange opening formed for a replacement of an exchangeable electric component; and a lid for engaging the exchange opening and for contacting the exchangeable electric component. According to the present invention, the heat releasing effect can be enhanced with no deterioration of the ease with which a heat generating component can be exchanged. In addition, the present invention can be embodied as a relatively simple mechanical structure, and manufacturing costs can be reduced.

3 Claims, 4 Drawing Sheets

MECHANICAL STRUCTURE OF INFORMATION PROCESSING DEVICE

FIELD OF THE INVENTION

The present invention relates to a mechanical structure for an information handling unit, such as a notebook computer or a laptop computer, in which many electric circuits are integrated into a small space, and in particular to the mechanical structure in areas adjacent to a component that generates heat. More specifically, the present invention pertains to a mechanical structure, for an information handling unit, with which both the cooling of a component that generates heat and their removal (their exchange with another component) can be effectively performed.

DESCRIPTION OF THE BACKGROUND

In accordance with recent technological developments, personal computers (e.g, laptop and notebook computers) that are more compact and lighter than desktop computers are being manufactured and sold.

FIG. 4 is a diagram illustrating the appearance of a notebook computer (hereinafter referred to simply as a "PC" or a "system") 100. This is the same as a computer system disclosed in Japanese Design Application No. Hei 06-30003 (Our Docket No.: JA9-94-621) that was also assigned to the present applicant.

In FIG. 4, the PC 100 is a so-called "structure with a lid" that comprises a thin main body 110 and a lid 120 pivotally hinged on the main body 110.

The lid 120 has a shallow upper case 121. A pair of cylindrical protrusions 122 are integrally formed at the lower edge of the upper case 121, and are rotatively supported by the main body 110, so as to hinge the lid 120 with the main body 110. A liquid crystal display (LCD) 123, the display means for the PC 100, is provided about in the center of the opened face of the upper case 121 (i.e., the reverse side of the lid 120). The lid 120 can be opened and closed relative to the main body 110 by sliding forward and backward operating portions 124 that are formed at the front on either side of the upper case 121.

The main body 110 has a shallow lower case 111. A support board 112 having a predetermined size is provided on the lower case 111 to shield the rear portion of an upper opening in the case 111. A keyboard/TrackPoint 113 ("TrackPoint" is a trademark of IBM Corp.) is provided about in the center of the upper opening to serve as a coordinate pointing means for the PC 100. A pair of loudspeakers 114 for audio output are provided at the right and left corners at the front of the keyboard unit 113. A pair of tongue-shaped protrusions 115 that are integrally formed at the rear edge of the keyboard unit 113 so as to be pivotally hinged at the front edge of the support board 112. An indicator 115A is provided on about the rear end of the lower case 111. The indicator 115A indicates the remaining capacities of a battery, the state of a PC card, the state of a floppy disk drive (FDD) and of a hard disk drive (HDD), and the status of the system 100 when the power is on.

In FIG. 5 is shown the internal structure of the main body 110 when the lid 120 and the keyboard 113 of the PC 100 are opened. A partition wall 116, which defines a front chamber and a rear chamber, is formed in the lower case 111 by bending a thin metal plate into a predetermined shape. In the rear chamber, which is hidden by the support board 112 and the partition wall 116, are stored a system board (not shown), on the surface of which are mounted essential electric components, such as a CPU (Central Processing Unit), a system memory, a memory controller, a ROM, a video controller and an audio controller. This rear chamber is relatively narrow and the installation density for the electric components mounted in this chamber is very high. In the front chamber, forward of the partition wall 116, input/output devices, such as an HDD pack 117 and a CD-ROM drive 118, and a battery pack 119, are removably and exchangeably mounted. Several connectors are provided on the front side of the partition wall 116 for mechanically and electrically coupling the terminals of the HDD pack 117, the CD-ROM drive 118 and the battery pack 119.

There has been a remarkable improvement in the performances of the latest personal computers. This improvement stems in great part from increases in the processing speeds of the CPUs that constitute the hearts of the PCs. However, as a trade off for high speed processing, the amount of heat generated in computers has also increased. The amount of the currents that pass through the transistors in chips have grown in proportion to the increases in the operating frequencies, and accordingly, a greater amount of power is being consumed. There have been developed and manufactured many CPUs of the type which employ CMOS technology so that they consume considerably less power than do conventional bipolar semiconductors such as TTL. However, since MOS transistors also include inherent capacitive elements in their gates, the amount of heat generated has also inevitably become greater in proportion to the operating frequencies. In particular, CPUs, such as the Pentium, produced by Intel Corp., that have operating frequencies of around 100 MHz generate a lot of heat. And although the Power PC 603 ("Power PC" is a trademark of IBM Corp.), which is jointly developed and produced by Apple Computer, Inc., IBM Corp. and Motorola Corp., generates considerably less heat than does the Pentium, it still generates no small amount of heat. Thus, some electronic components may run wild, out of control, or may suffer damage due to the heat they generate by themselves. Heat generation is an especially critical problem for the above described notebook computers, because the installation density for internal electronic parts is quite high so that there is no room available for the escape of heat. Although forced cooling by employing a fan is possible with a desktop PC, in a notebook PC the space that is required for the installation of a fan can not be spared.

For electronic components that generate heat, such as CPUs, video controller chips, system memories, and co-processors in current notebook PCs, a mechanical structure is often employed wherein a cooling channel is provided by mounting components so that they contact a heat pipe for heat transmission, or wherein heat is transmitted to the exterior of a device by bringing components into contact with a heat sink (a metal case also sometimes serves as a heat sink) that is made of a heat conductive material (e.g., copper or aluminum) having a large surface area. Compared with forcible cooling using a cooling fan, since the height of a fan need not be accommodated, a natural cooling arrangement using a heat sink or a heat pipe has a smaller volume, and thus has almost no affect on the design and manufacture of compact PCs. It should be noted that a relatively complicated laminated structure is used for joining together a circuit board, electronic components, and a heat pipe.

In FIG. 6 is shown a conventional cooling structure employed for a notebook computer. A heat generating component, such as a CPU chip, is so mounted on a system board that it faces a wall of a case (e.g., the lower case 111). The case is made of a superior heat conductive material, such as a magnesium alloy. An elastic material (e.g., silicon rubber) having a relatively high heat conductive capability is adhered to the top surface of the CPU chip, and thermally communicates with a wall of the lower case 111. The lower case 111, which is integrally formed by casting, for example, has a relatively large surface area, and also serves as a heat sink. As the CPU chip generates the most heat at its top surface, with the above described structure, the heat can be effectively dispersed through the silicon rubber and the lower case 111.

On the other hand, the requirement for upgrading the performances of personal computers have been responded by various forms. Many of recent PCs permit system upgrades involving the replacement of standardly provided CPUs with other, pin compatible CPUs (generally, new CPU versions having higher processing speeds, e.g., PowerPC 603+ relative to PowerPC 603). It would be obvious to one having ordinary skill in the art that the periphery of a exchangeable CPU should be so designed with a relatively simple mechanical structure that the removal and replacement of the CPU could be easily performed. However, as is described above, the periphery of a CPU that generates much heat is so built that a close and complicated relationship exists with cooling components, such as a heat pipe and a heat sink, and it is not easy to design a mechanical device that easily permits the attachment and removal of the CPU. Conventionally, the upgrading of CPU chips is performed only for desktop PCs having extra space inside their cases that permits the inclusion of structures designed for the exchange of CPU chips.

It is highly improbable that a CPU chip exchange could be effected with the prior art shown in FIG. 6. And since heat is channeled off only from the top face of the CPU chip, a superior cooling effect would not be provided. Further, as the temperature at the portion of the lower case 111 immediately below the CPU chip would tend to be higher, this could constitute a safety hazard for a user.

OBJECTIVES

It is one object of the present invention to provide a superior mechanical structure for an information handling unit, such as a notebook computer or a laptop computer, whereby multiple electronic circuits are stored in a small space.

It is another object of the present invention to provide superior mechanical peripheral structures for heat generating components in an information handling unit.

It is an additional object of the present invention to provide a mechanical structure, for an information handling unit, with which both cooling of heat generating components and removal of the heat generating components (their exchange with other components) are preferably performed.

SUMMARY OF THE PRESENT INVENTION

To achieve the above objects, according to a first aspect of the present invention, provided is a mechanical structure, for an information handling unit in which are included one or more exchangeable electric components, whose interior is enclosed by a box. The box has: an exchange opening formed for a replacement of an exchangeable electric component; and a lid for engaging the exchange opening and for contacting the exchangeable electric component.

An exchangeable electric component is, for example, a CPU chip or a CPU card mounting a CUP chip.

According to a second aspect of the present invention, provided is a mechanical structure, for an information handling unit in which are included a system board mounting more than one electric components, whose interior is enclosed by a box. The box has: an exchange opening formed at a position opposite an exchangeable component that is mounted on the system board; and a lid for hiding the exchange opening, the lid being attached to the box so that the lid, the exchangeable component, a heat releasing member, and the system board are laminated together in the named order.

In this case, if the mechanical structure is so designed that the exchangeable component contacts the heat releasing member and the lid at the time of attachment, an enhanced heat releasing effect is obtained. When a heat pipe is used as the heat releasing member, the heat releasing effect is improved.

According to a third aspect of the present invention, provided is a CPU card, that can be connected to a system board on which wiring is printed, comprises: a CPU chip mounted on the CPU card; a center opening formed at about the center of the CPU card; and a connector for a connection to the system board, the connector being mounted on the same surface as said CPU chip.

The exchangeable component according to the second aspect may be a CPU card. In this case, an opening in a CPU card is formed through the lid, and a flat protrusion is formed to contact the lower face of the CPU chip, so that the heat release at the lid can be accelerated.

According to the present invention, provided is a mechanical structure, for an information handling unit, such as a notebook computer or a laptop computer, wherein in a small space are integrated multiple electric circuits, with which both cooling of a heat generating component in the unit and removal of the heat generating component (an exchange with another component) can be effectively performed.

According to the present invention, heat can be released from both the upper and the lower surfaces of heat generating components, thus providing an excellent heat releasing effect.

Further, according to the present invention, the heat releasing effect can be enhanced with no deterioration of the ease with which a heat generating component can be exchanged.

In addition, the present invention can be embodied as a relatively simple mechanical structure, and manufacturing costs can be reduced.

The other objects, features, and advantages of the present invention will become apparent in due course during the detailed description of the embodiment of the present invention, which will be given while referring to the accompanying drawings.

DESCRIPTION OF THE PREFERRED EMBODIMENT

The preferred embodiment of the present invention will now be described in detail while referring to the accompanying drawings.

Figure 1:
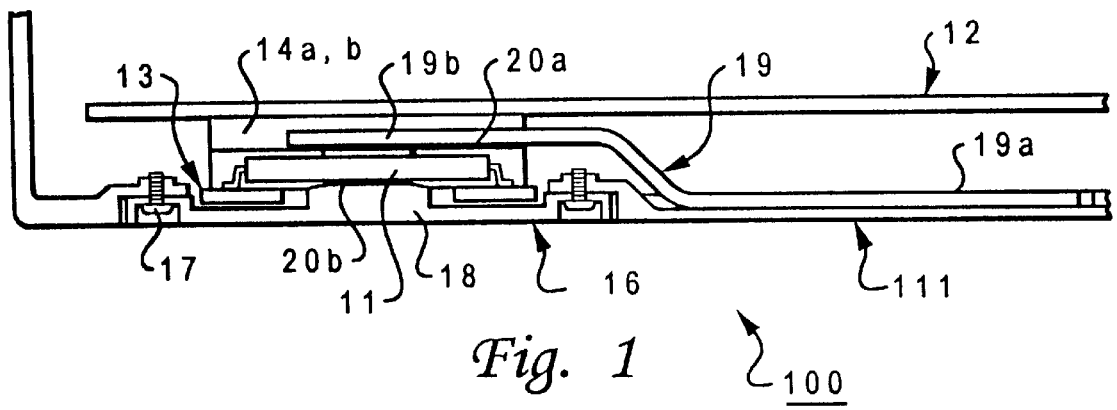
FIG. 1 is a partial cross-sectional view of a main body 110 of a notebook computer 100 according to one embodiment of the present invention.
Figure 5:
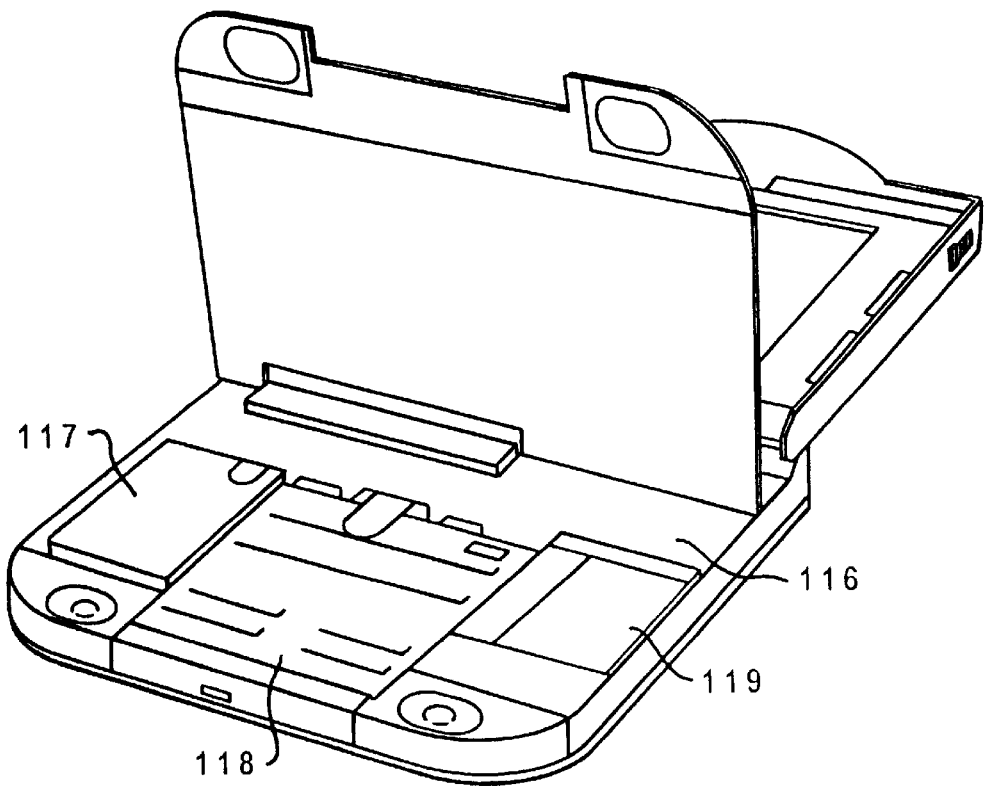
FIG. 5 is a diagram illustrating the condition when a cover 120 and a keyboard 113 of the PC 100 are opened to expose the internal structure of the main body 110.
Figure 4:
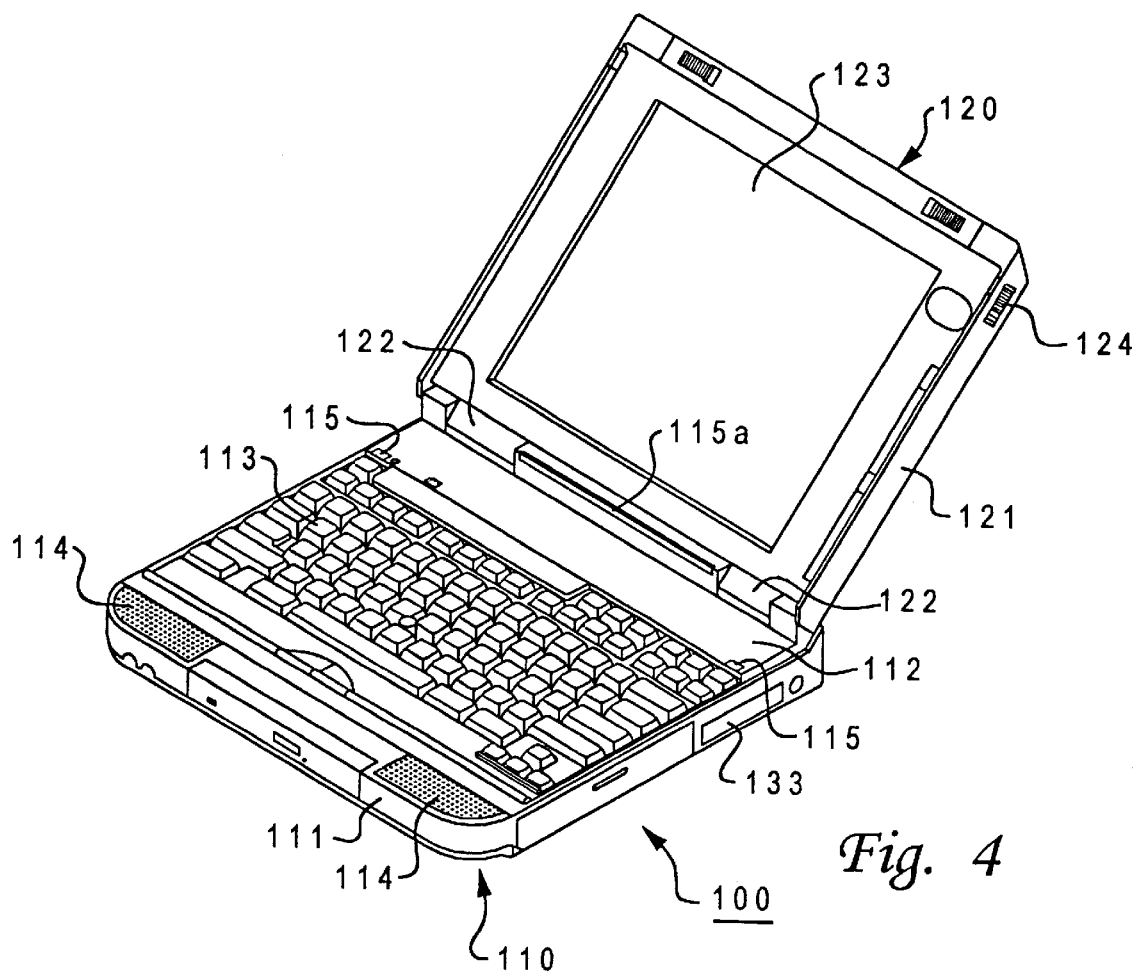
FIG. 4 is a diagram illustrating the appearance of the PC 100.

FIG. 1 is a partial cross-sectional view of a main body 110 of a notebook computer 100 according to one embodiment of the present invention. The same reference numbers as are used in FIGS. 4 and 5 are also used to denote corresponding or identical components.

A system board 12, on the surface of which various electric circuits are mounted, is accommodated into a lower case 111. In this embodiment, the lower case 111 and an upper case 121 are made by casting using a magnesium alloy so as to provide superior mechanical strength, heat release, and EMI (Electromagnetic Interference) prevention.

Stacking connectors 14a are mounted on the lower surface of the system board 12. The stacking connectors 14a are connected to stacking connectors 14b on a CPU card 13.

Figure 6:
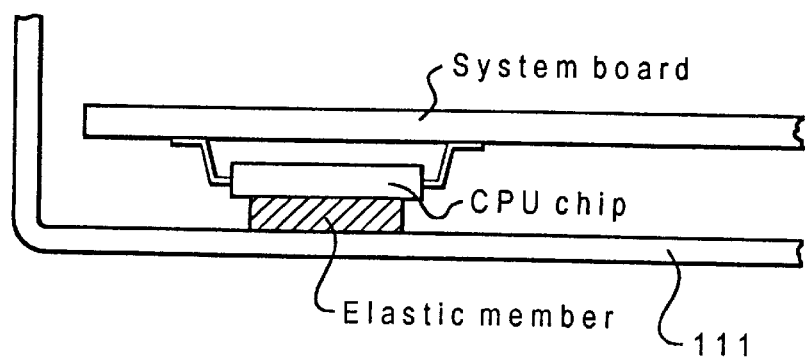
FIG. 6 is a diagram illustrating a conventional cooling structure employed for a PC 100.

The CPU card 13 has a rectangular opening 15 about in its center, and has a CPU chip 11 mounted on its upper surface, i.e., on the surface on which the stacking connectors 14b are mounted. It should be noted that, unlike the prior art in FIG. 6, the CPU chip 11 is provided opposite the system board 12.

A heat pipe 19 is located between the system board 12 and the CPU card 13. As is well known, the heat pipe is a metal (e.g., copper) sealed pipe in which a capillary material and a small amount of liquid are held under a partial vacuum. By the evaporation of the liquid, heat is absorbed at one end (the heat generating component side) of the pipe, and by the condensation of steam, heat is discharged at the other end (outside the unit) of the pipe. The heat transfer speed for the heat pipe is said to be equivalent to the speed of sound. A heat pipe 19 in FIG. 1 has a flat elongated shape in cross section, and is longitudinally bent near its center to form two flat portions 19a and 19b extending outward from either side of the bent portion. The flat portion 19a is secured to the bottom of the lower case 111 by using a plurality of machine screws 17 (see FIG. 2). The flat portion 19b, a free end, is located above the bottom of the lower case 111, so that it contacts the upper face of the CPU chip 11 when the CPU card 13 is inserted. The heat pipe 19 can bend a little, and when the height at the bent portion in its center is slightly less than the height of the CPU chip 11 when it is inserted, the heat pipe 19 is slightly pressed against the CPU chip 11 by its restoring force. As a result, errors in machining accuracy and in assembly are compensated for, and mechanical and thermal contact between the components 11 and 19 can be ensured. Generally, most heat is generated at the top face of the CPU chip. In this embodiment, such heat is transmitted to the bottom of the lower case 111 by the heat pipe 19 which serves as a heat channel. Since the lower case 111 is integrally formed by using a superior heat conductive magnesium alloy, and has a large surface area, the lower case 111 can also serve as a heat sink.

An exchange opening for exchanging the CPU card 13 is formed in the bottom of the lower case 111, below the CPU card 13 (see FIGS. 2 and 3). When the CPU card 13 is not being exchanged, to cover the opening, a bottom lid 16 is fitted into the exchange opening, and is secured by the machine screws 17.

A stage 18 having a predetermined height is formed about in the center of the bottom lid 16. When the bottom lid 16 is secured to the lower casing 111 by the screws 17, the stage 18 is inserted through the opening 15 of the CPU card 13 and then contacts the lower face of the CPU chip 11. The bottom lid 16, as is the same as the cases 111 and 121, is an excellent heat conductive member made of a magnesium alloy or an aluminum alloy and also serves as a heat sink. Therefore, the heat generated by the CPU chip 11 is released from the upper and lower surfaces by the heat pipe 19 and the bottom lid 16.

Resin sheets 20a and 20b (e.g., silicon rubber doped with aluminum oxide powder) that are superior in both elasticity and heat conductivity may be adhered to the upper and lower surfaces of the CPU chip 11. The resin sheets 20a and 20b are useful for absorbing errors in machining accuracy and in assembly, and for ensuring there is adequate thermal contact between the CPU chip 11 and the heat pipe 19 and the stage 18.

Figure 2:
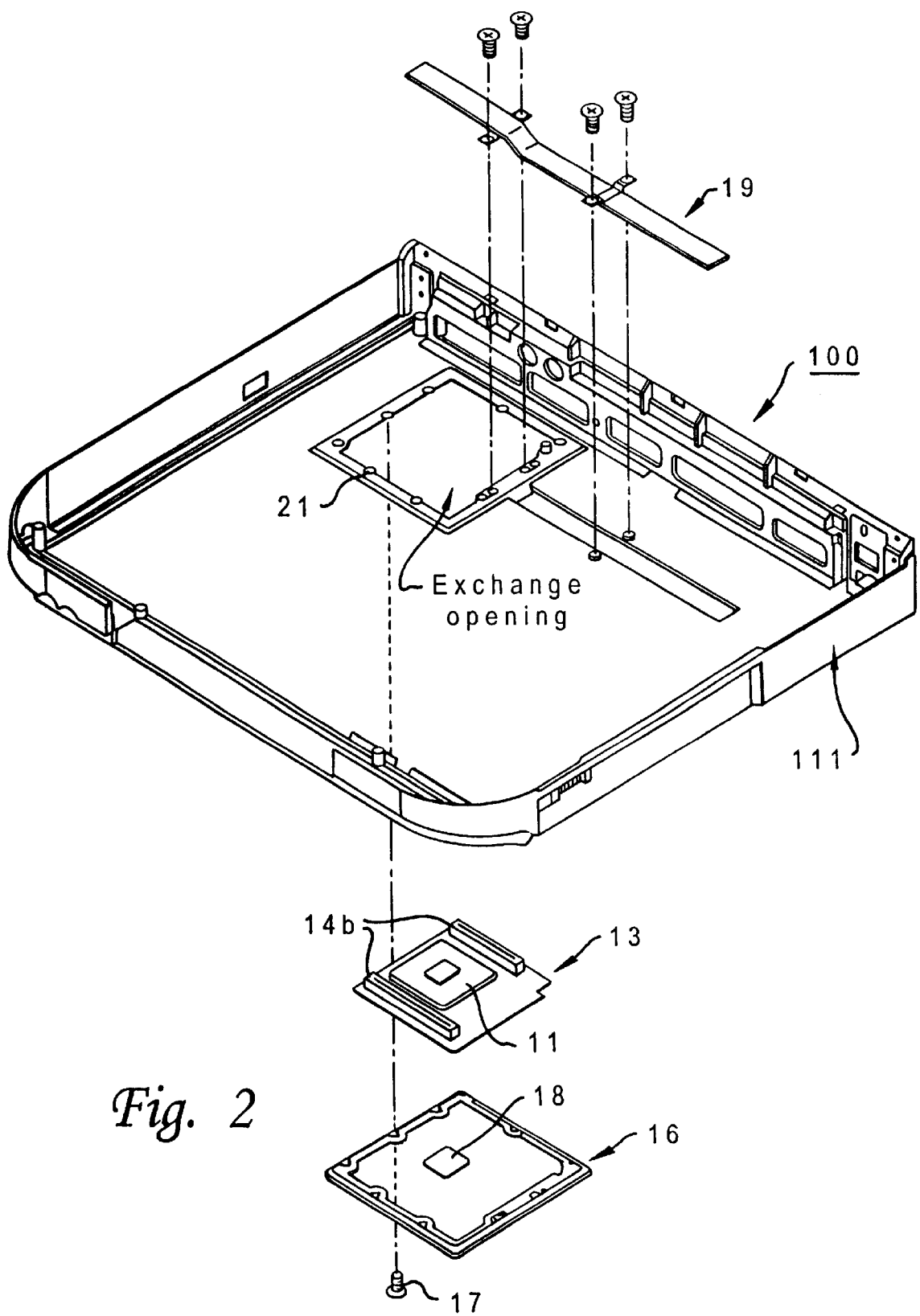
FIG. 2 is an exploded diagram illustrating a lower case 111 of the PC 100.
Figure 3:
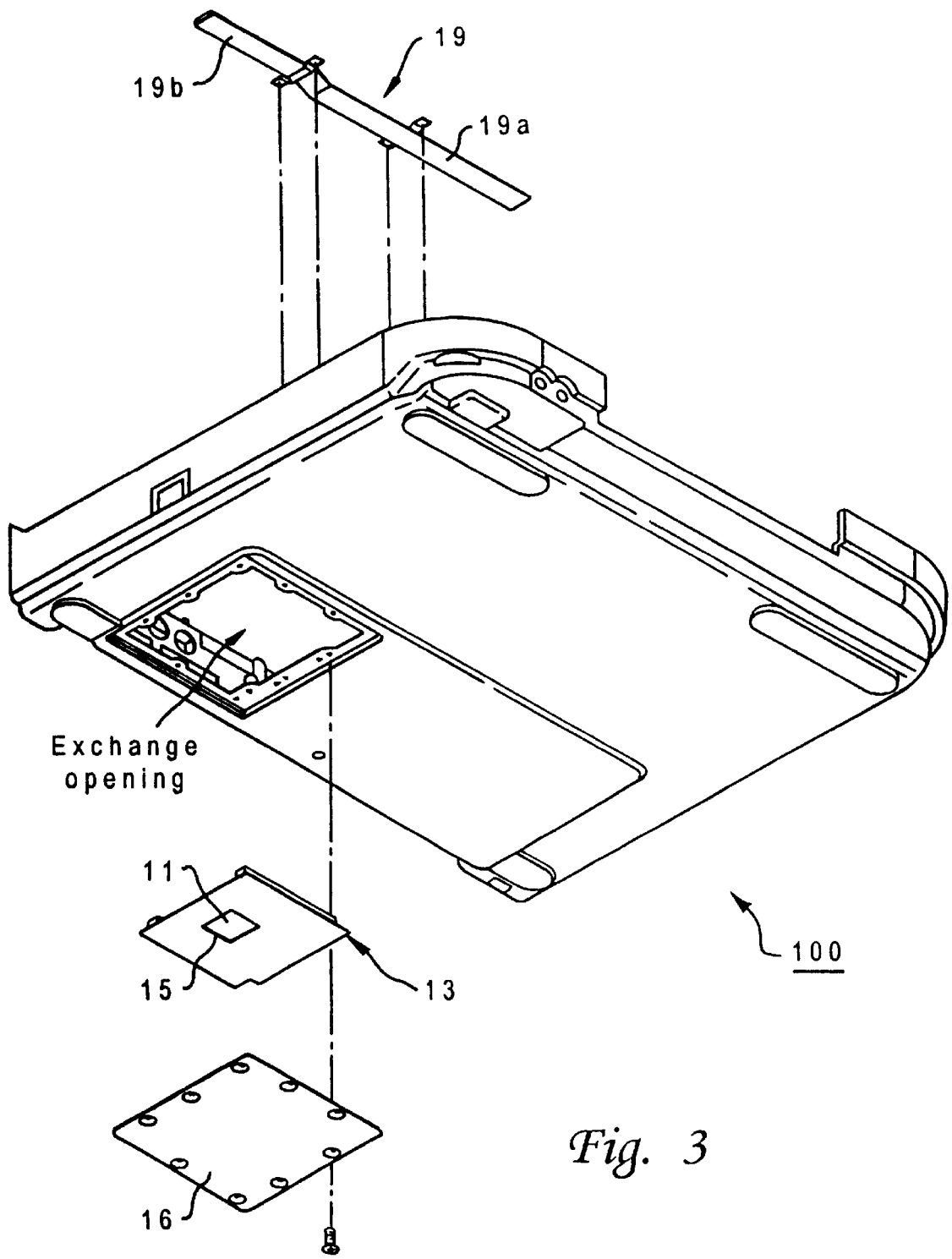
FIG. 3 is an exploded diagram illustrating the lower case 111 of the PC 100.

FIGS. 2 and 3 are exploded diagrams showing the lower case 111 of the PC 100 viewed from above and below (the system board 12 is not shown).

A plurality of bosses/screw holes 21 are formed along the edges of the exchange opening in the bottom of the lower case 111 and along the side edges of the heat pipe 19 for screws with which to secure the bottom lid 16 and the heat pipe 19. A groove is formed to receive the flat portion 19a so as to embed the heat pipe 19 at a predetermined position.

It can be easily understood by referring to FIGS. 2 and 3 that when assembling the main body 110 first the heat pipe 19 is screwed to the lower casing 111 and then the system board 12 (not shown in FIGS. 2 and 3) is attached to a predetermined adaptor (not shown). As was previously described, the CPU chip 11 and the stacking connectors 14b are mounted on the same surface of the CPU card 13. When the CPU card 13 is to be inserted into the exchange opening of the lower casing 111, the surface of the CPU card 13 on which the CPU chip 11 and the stacking connectors 14b are mounted faces upward. When the CPU card 13 communicates with the system board 12 via the stacking connectors 14a and 14b, the upper face of the CPU chip 11 is pressed against the flat portion 19a by the restoring force that acts on the bent portion of the heat pipe 19. Further, the bottom lid 16 is fitted into the exchange opening of the lower casing 111 and is secured therein by the screws 17. The assembly is thereafter terminated. At the position where the bottom lid 16 is secured by screws, the stage 18 is inserted through the opening 15 in the CPU card 13 and contacts the lower face of the CPU chip 11. Thus, heat can be released from the lower face.

To exchange the CPU card 13, only the bottom lid 16 need be removed and the CPU card 13 separated from the system board 12. Unlike the prior art in FIG. 6, the CPU chip 11 is located opposite the system board 12. The heat pipe 19 is not positioned in the direction in which the CPU card 13 is extracted, but in the opposite direction. In short, as there are no components that obstruct or interfere with the removal of the CPU card 13, the exchange procedure can be smoothly performed.

The present invention has been described in detail while referring to a specific embodiment. However, it should be obvious to one having ordinary skill in the art that various modifications or revisions of the embodiment are possible within the scope of the present invention. For example, the present invention can be applied to portable information handling units, such as word processors. That is, although the present invention has been disclosed by using an example, it should not be limited to that example. To fully understand the subject of the present invention, the claims should be referred to.

According to the present invention, provided is a superior mechanical structure for an information handling unit, such as a notebook computer or a laptop computer wherein multiple electronic circuits are stored in a small space, with which both the cooling of heat generating components and the removal of the heat generating components (to exchange them with other components) are effectively performed.

We claim:

1. A mechanical structure, for an information handling unit having a system board on which more than one electronic components are mounted, comprising:

(a) an box for enclosing said system board;

(b) an exchange opening formed on the bottom surface of said box;

(c) a first connecting member provided on said system board at a position opposite said exchange opening;

(d) a card member having a second connecting member that can be coupled with said first connecting member, an exchangeable component, and a center opening formed at the bottom of said exchangeable component, said second connecting member and said exchangeable component being mounted on the same surface of said card member;

(e) a heat releasing member being sandwitched between said system board and said exchangeable component; and (f) a lid member for hiding said exchange opening, a flat protrusion being formed on said lid to mechanically contact a lower surface of said exchangeable component through said center opening.

2. The mechanical structure according to claim 1, said exchangeable component being a CPU.

3. The mechanical structure according to claim 1, said heat releasing member being a heat pipe.

* * * * *